United States Patent

[11] 3,621,486

[72] Inventors Bernard F. Gunshinan
Sepulveda;
Frederick W. Hand, Jr., Burbank, both of Calif.

[21] Appl. No. 23,636
[22] Filed Mar. 30, 1970
[45] Patented Nov. 16, 1971
[73] Assignee The Bendix Corporation

[54] DIRECT CURRENT SHORT CIRCUIT DEVICE
3 Claims, 4 Drawing Figs.

[52] U.S. Cl. .......... 333/97 R,
333/31 R, 333/73 S, 333/84 M
[51] Int. Cl. .......... H01p 3/08,
H01p 1/00
[50] Field of Search .......... 333/10, 31,
34, 73 S, 84 M, 84

[56] References Cited

UNITED STATES PATENTS

| | | | |
|---|---|---|---|
| 2,854,645 | 9/1958 | Arditi | 333/84 M X |
| 3,513,414 | 5/1970 | Howe, Jr. | 333/10 |

*Primary Examiner*—Herman Karl Saalbach
*Assistant Examiner*—Paul L. Gensler
*Attorneys*—Robert C. Smith and Plante, Arens, Hartz, Smith and Thompson

ABSTRACT: A miniature microstrip device is described which constitutes a highly effective direct current short circuit device while retaining the ability to transmit a very wide range of frequencies above the cutoff frequency. Each of two printed circuit conductor patterns is positioned on opposite faces of a dielectric substrate. Each conductor has a wide, but tapered, ground plane conductor connecting to a smoothly tapered "hot side" conductor track tapered such as according to a Tchebycheff pattern. These conductors are reversibly aligned on the substrate such that each "hot side" conductor is associated with the ground plane portion of the opposite conductor. Each end is adapted to be connected to a conventional microwave coaxial line with the ground plane portion of one printed conductor connected to the shielding portion and the "hot side" end of the opposite conductor connected to the center conductor of the coaxial line. Thus, each center, conductor is connected through the printed circuit conductor to a grounded portion of the opposite connector, thus grounding all direct current. The microwave frequencies, of course, are transmitted from the input lead across the substrate to the opposite center conductor.

DC SHORT

INVENTORS
BERNARD F. GUNSHINAN
FREDERICK W. HAND JR.

Robert C. Smith
ATTORNEY

DIRECT CURRENT SHORT CIRCUIT DEVICE

BACKGROUND OF THE INVENTION

In connection with microwave work, it frequently becomes necessary to provide a means for completely shorting out or eliminating direct current signals and other low-frequency signals which may be present along with a desired microwave frequency signal. Current designs for such microwave devices have some known and substantial disadvantages. Such devices are normally in the form of mechanical coaxial devices which require relatively close tolerances in fabrication and are thus comparatively expensive. Many of these will still impose some common resistance to direct current and low frequencies and thus do not completely eliminate them. Most important, such devices typically have a limited band width above the lower cutoff frequency.

SUMMARY OF THE INVENTION

The device described herein is a microwave device having two conductor tracks attached to opposite faces of a substrate having a substantial dielectric constant and which serves as a direct current short circuit device. The substrate may be of alumina or any suitable dielectric, and the tracks may be applied by conventional printed circuit techniques. This direct current short circuit device may be considered as similar to a pair of impedance-matching transformers of the type described in copending application Ser. No. 850,888 now U.S. Pat. No. 3,523,260 of Bernard F. Gunshinan et al. (common assignee), but with the conductors connected end to end inverted, and mounted on the same substrata. For certain applications of this device, the impedance transformation described in said copending application is desirable, but it is not necessary to the function of this device, whereas the mode change described therein is necessary to the function of the device. Over approximately one-half of the length of said impedance-matching transforms the transformation is accomplished by microstrip techniques in which the "hot" side of the coaxial line is connected to a printed circuit conductor having a smooth-tapered characteristic, such as a Tchebycheff taper, which gives a smooth response, and the outer conductor is connected to a ground plane of sufficient area as to give operation similar to that of a theoretical infinite ground plane. The "hot" side conductors taper from a significant width to a minimum practical width, such as 0.005 inch, to achieve the desired additional mode (and impedance) changes. With the ground plane conductor smoothly tapered over the entire length, there were no troublesome reflections from the mode (and impedance) transition, and the device is extremely broad band, operating very satisfactorily over the range from 1–12 GHz. and beyond.

By effectively connecting two of such transformers end to end and with the small end of the ground plane conductor of one connected to the small end of the "hot" side conductor of the other (inverted), it has been found that a very useful device results. It has very little signal loss in the normal pass band, it operates as a very effective short circuit for direct current and low frequencies, and it imposes an essentially 180° phase shift on the alternating current signal which it passes, in addition to the phase shift resulting from its physical length. Thus, in addition to serving as a very simple and effective direct current short circuit device having a very wide passband, it also may be used as a 180° phase shift device. And while a single such device does not have a particularly sharp cutoff at low frequencies, a number of such devices may be connected in cascade to provide an effective high-pass filter. Impedance changes may also be incorporated within the devices to enhance filter element properties.

DESCRIPTION OF THE PREFERRED EMBODIMENT

Figures 1, 1A, 2, 3:
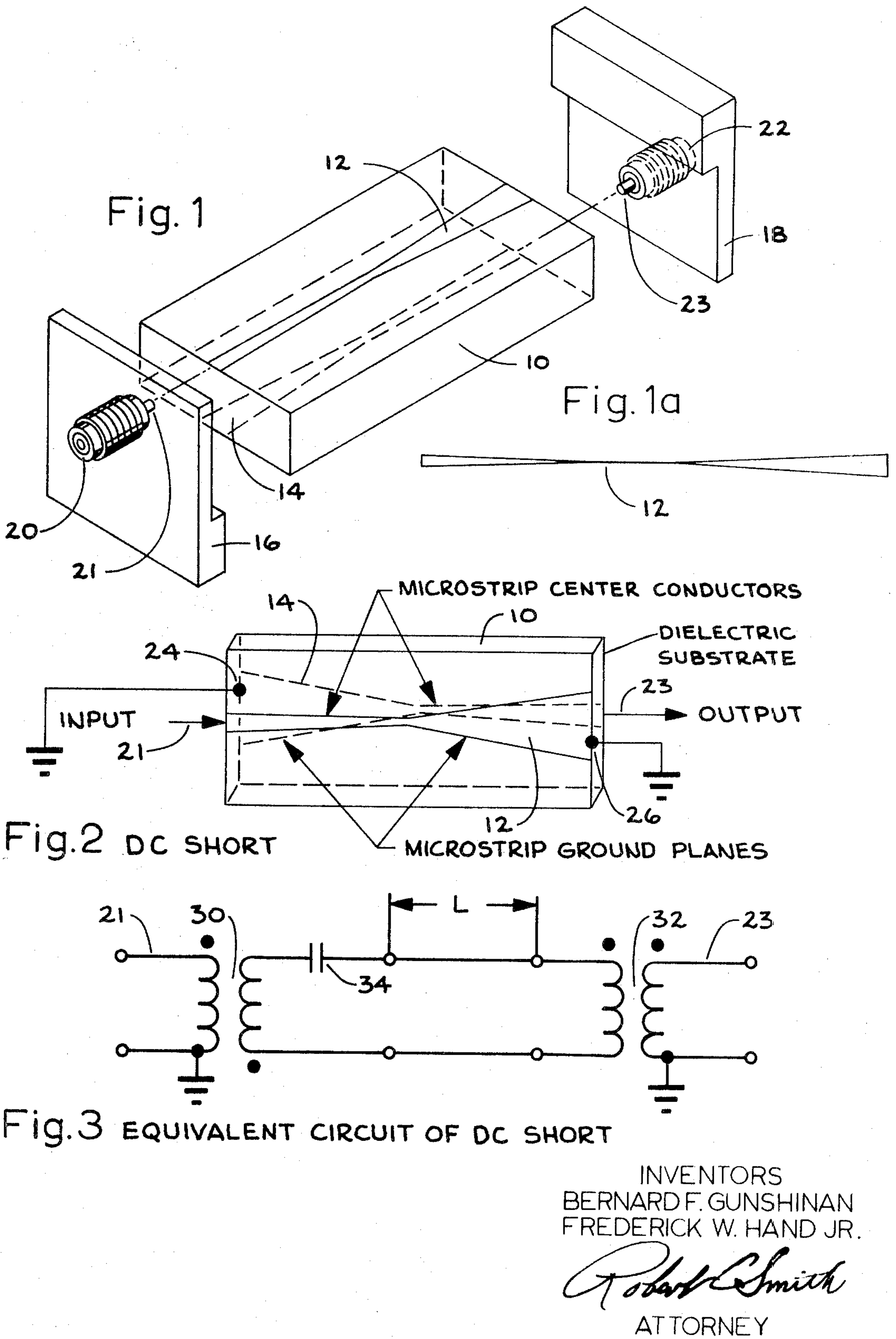
FIG. 1 is an exploded perspective view of our microwave direct current short circuit device and associated coaxial connectors and bulkheads.
FIG. 1*a* is an enlarged plan view of the conductors shown in FIG. 1.
FIG. 2 is a somewhat different perspective view of the device of FIG. 1 including schematic representation of the electrical connections to the device.
FIG. 3 is a schematic representation of a circuit equivalent to the device of FIGS. 1 and 2.

FIG. 1 shows our direct current short circuit device including a substrate 10 of medium dielectric material such as alumina. This substrate may be approximately 0.025 inches thick. A first conductive track 12 is attached to the top side of the substrate, and a second conductive track 14 (shown in dotted outline) is fastened to the lower side of the substrate. A top plan view of conductor track 12 is shown in FIG. 1*a*, which is identical to conductor 14 except that the ends are reversed. Applicants have typically used gold conductors which have the desirable qualities of good conductivity and relative freedom from oxidation. Other dielectric materials and conductors may be used, and those skilled in the art are aware of the considerations involved in matching the dielectric thickness and the conductor width and materials to the frequency range and environmental conditions to be expected. For operation in the 2–12 Ghz. frequency band and with the substrate described, the tracks 12 and 14 were made approximately 0.025 inch wide at the input end and approximately 0.025 inch wide at the maximum width end.

Located at the ends of substrate member 10 are bulkheads 16 and 18 which provide means for supporting coaxial connectors 20 and 22, respectively. The center conductor from the connector 20 is soldered or otherwise fastened to the smaller end of conductor track 12, and its shield or case is soldered or fastened to the ground plane end of conductor track 14. Similarly, the center conductor of connector 22 is soldered to the narrow end of the conductor track 14, and the shield portion is soldered to the ground plane portion of conductor 12.

A somewhat different perspective view of the device of FIG. 1 is shown in FIG. 2. Here again, the substrate is shown at numeral 10 with the conductor 12 on the forward or visible side of the substrate and the conductor 14 on the back side shown in dotted outline. As shown schematically, the signal-carrying conductor 21 provides the input signal to the system, and the shielded side of the connector is connected to ground and is shown soldered to the ground plane portion of conductor track 14 at numeral 24. Similarly, the output is taken from the center conductor 23, and the ground plane portion of conductor 12 is grounded as shown, and it will be recognized that this structurally corresponds to the shield part of the connector 22. This connector is soldered to the ground plane end of conductor track 12 at point 26.

A schematic diagram of a circuit substantially equivalent to that provided by the device of FIGS. 1 and 2 is shown in FIG. 3. As previously described, each half of the structure mounted on substrate 10 consists of an impedance-matching transformer which also effects a mode transformation. Thus, one-half of this device may be considered as having, among other things, the characteristics of a transformer 30, and the other half, the characteristics of a transformer 32. One side of the primary winding of transformer 30 and one side of the secondary winding of transformer 32 are grounded. It will be observed that the dot notation with respect to the transformers indicates that the polarities are reversed with respect to each other. Thus, if the input signal on terminal 21 is positive at any given instant, the lower end of the secondary winding of transformer 30 will be positive, the upper end of the primary winding of transformer 32 will be positive, as well as the upper end of its secondary winding. Since a transformer might conceivably transform some voltage across the air gap even at very low frequencies, the capacitor 34 has been included to make it clear that direct current is effectively blocked. The line segment designated L indicates a measurable time delay for the signal passing through the device.

It will be apparent to those skilled in the art that the device will function as an extremely effective direct current short circuit device since any direct current component appearing at numeral 21 is connected through conductor track 12 directly to ground. As previously stated, the device does operate as a high-pass filter with an extremely broad band above a normal operating frequency, and a very effective high-pass filter with a reasonably sharp cutoff may be fashioned through proper cascading of a number of such devices. Where it is desired to utilize the 180° phase shift characteristic of the device, an input structure including a signal divider would be used which would permit retaining the original phase relationship which could then be compared with the output signal appearing at output line 23. The size of the device and conductor tracks, etc., is closely related to the frequency range of interest, although the structure described is efficient over a rather board frequency range extending from about 1 GHz. to above 12 GHz. The thickness of the dielectric substrate 10 will vary with the frequency and the dielectric constant of the material used. For further frequency range extension, the conductors can be made self-supporting (air dielectric), thus allowing elimination of resonant modes and dielectric losses resulting from the substrate.

We claim:

1. A microwave direct current short circuit device having an unusually broad passband comprising:

a high dielectric substrate having two essentially parallel spaced sides;

a first conductor fastened to a first side of said substrate and extending across its length, said conductor having its maximum width at one end of said first side and tapering to its minimum width near the center of said side, with said minimum width maintained over approximately the next quarter of the length of said side and tapering smoothly to a greater width over the remaining quarter of said length, said width being substantially greater than said minimum width and substantially less than said maximum width; and a second conductor fastened to a second side of said substrate and extending across its length, said conductor being of essentially the same configuration as said first conductor but having its end of maximum width at the opposite end of said substrate from the corresponding end of said first conductor, said first and second conductors being aligned on said substrate such that the broader tapered portion of each of said conductors acts as a ground plane for the remaining portion of the opposite conductor.

2. A microwave direct current short circuit device as set forth in claim 1 wherein the smaller tapered portion of said conductors is contoured to provide Tchebycheff response characteristics.

3. A direct current short circuit device as set forth in claim 1 wherein said dielectric material comprises a substrate alumina having said conductors bonded to opposite sides thereof.

* * * * *